US010200424B2

(12) United States Patent
Bekiares et al.

(10) Patent No.: US 10,200,424 B2
(45) Date of Patent: Feb. 5, 2019

(54) SEAMLESS DELIVERY OF REAL-TIME MEDIA STREAM WITH INTERMITTENT SIGNAL LOSS

(71) Applicant: GOGO LLC, Chicago, IL (US)

(72) Inventors: Tyrone D. Bekiares, Park Ridge, IL (US); Brian R. Smith, Chicago, IL (US); Sajit Sasi, Burr Ridge, IL (US); William A. Kelleher, Chicago, IL (US)

(73) Assignee: GOGO LLC, Chicago, IL (US)

( * ) Notice: Subject to any disclaimer, the term of this patent is extended or adjusted under 35 U.S.C. 154(b) by 302 days.

(21) Appl. No.: 15/278,385

(22) Filed: Sep. 28, 2016

(65) Prior Publication Data

US 2018/0091567 A1    Mar. 29, 2018

(51) Int. Cl.
| | |
|---|---|
| *H04L 29/06* | (2006.01) |
| *H04L 29/08* | (2006.01) |
| *H04B 7/185* | (2006.01) |
| *H04W 36/00* | (2009.01) |

(52) U.S. Cl.
CPC ..... *H04L 65/4069* (2013.01); *H04B 7/18506* (2013.01); *H04B 7/18513* (2013.01); *H04L 65/4076* (2013.01); *H04L 65/605* (2013.01); *H04L 65/80* (2013.01); *H04L 67/02* (2013.01); *H04L 67/12* (2013.01); *H04W 36/0016* (2013.01)

(58) Field of Classification Search
CPC .................................................. H04L 65/4069
See application file for complete search history.

(56) References Cited

U.S. PATENT DOCUMENTS

| | | | |
|---|---|---|---|
| 6,587,464 B1 | 7/2003 | Brown et al. | |
| 7,043,196 B1 | 5/2006 | Kawai et al. | |
| 7,986,951 B2 | 7/2011 | Febvre et al. | |
| 8,169,946 B2 * | 5/2012 | Lynch | H04B 7/18508 370/316 |

(Continued)

OTHER PUBLICATIONS

International Search Report and Written Opinion in International Application No. PCT/US2017/053479 dated Dec. 5, 2017, 12 pages.

(Continued)

*Primary Examiner* — Adnan M Mirza
(74) *Attorney, Agent, or Firm* — Marshall, Gerstein & Borun LLP; Randall G. Rueth

(57) ABSTRACT

A real-time media stream, multicast by a remote computing system, is received by an on-board system of a vehicle. While being received, the real-time media stream is packaged into time-delineated media segments that are input to a buffer. One or more missing segments are identified after a signal loss event (e.g., a satellite handoff), and a request for the missing segment(s) is/are caused to be sent to the remote computing system. The missing segment(s) is/are received from the remote computing system via a unicast transmission, and inserted into the buffer in sequence with the time-delineated media segments. The buffered real-time media stream, including the inserted segment(s), is caused to be provided to one or more electronic devices on-board the vehicle. In this manner, the real-time media stream may be seamlessly delivered to the on-board electronic device(s) despite a loss of connectivity due to the signal loss event.

19 Claims, 7 Drawing Sheets

(56) References Cited

U.S. PATENT DOCUMENTS

| | | | |
|---|---|---|---|
| 8,555,163 | B2 | 10/2013 | Sood et al. |
| 8,949,452 | B2 | 2/2015 | Harrang et al. |
| 9,281,891 | B2 | 3/2016 | Lee |
| 2011/0002378 | A1* | 1/2011 | Raveendran ........... H04H 20/40 375/240.01 |
| 2013/0290555 | A1 | 10/2013 | Einarsson et al. |
| 2015/0092657 | A1 | 4/2015 | Ferrarotti et al. |

OTHER PUBLICATIONS

Written Opinion in International Application No. PCT/US2017/053479 dated Sep. 7, 2018, 8 pages.

Brendan Long, "The Structure of an MPEG-DASH MPD", Mar. 20, 2015, XP 055214008, retrieved from the internet on Sep. 17, 2015, https://www.brendanlong.com/the-structure-of-an-mpeg-dash-mpd, 4 pages.

From Wikipedia: "Dynamic Adaptive Streaming over HTTP", Sep. 15, 2016, XP 055502877, retrieved from the internet on Aug. 28, 2018, https://web.archive.org/web/20160915194916/https://en.wikipedia, 7 pages.

* cited by examiner

SEAMLESS DELIVERY OF REAL-TIME MEDIA STREAM WITH INTERMITTENT SIGNAL LOSS

FIELD AND BACKGROUND OF THE DISCLOSURE

Technical Field

The instant disclosure generally relates to delivering real-time media streams (e.g., Internet Protocol television (IPTV), streaming radio, etc.) to electronic devices on-board vehicles, and, in particular, to a system that utilizes multicast communications to provide real-time media streams to devices on-board multiple vehicles and unicast communications to provide missing media segments that were lost due to handoffs or other events.

Background

Currently, some airlines provide a television service to devices that are on-board an aircraft (e.g., seatback monitors, smart phones, tablets and/or laptop computing devices of passengers), while the aircraft is traveling en route to a destination. In some such systems, television service is delivered to multiple aircraft via a multicast satellite uplink of Internet Protocol Television (IPTV), multiplexed alongside other Internet Protocol (IP) data services. During the course of a flight, however, an individual aircraft will likely lose connectivity momentarily due to one or more handoffs between satellite transponders. For example, longer (e.g., international) flights may require one or more handoffs as the aircraft moves between the coverage areas of different satellites. Even for relatively short flights, a number of beam handoffs (or "beam switches") may be required if the satellite operator implements spot beam technology. Unfortunately, satellite handoffs (including spot beam handoffs for a single satellite) typically involve "break-before-make" connections. For example, 30 to 90 seconds of signal loss is typically expected when handing off from a spot beam of one satellite to a spot beam of another satellite, and roughly 10 seconds of signal loss is typically expected when handing off between spot beams of a single satellite.

While some services may not be greatly impacted by this loss of connectivity (e.g., non-real time IP data services, such as email or web browsing), quality of service and the overall user experience can be significantly impacted when providing IPTV or other real-time content (e.g., other streaming video/audio, or streaming audio only). In these cases, loss of connectivity may cause users to miss some or all of the content that was multicast during that time period (e.g., in a manner similar to unplugging a television or radio in one's home for a period of time while watching or listening to a broadcast program). At a minimum, such an interruption of service is likely to annoy the end user. Moreover, if the end user paid any fees for real-time content (e.g., for general access to broadcast television programming, or to watch a specific program such as a boxing match), the interruption is very likely to result in more customer and/or airline complaints, and/or more requests for refunds.

BRIEF SUMMARY OF THE DISCLOSURE

This summary is provided to introduce, in a simplified form, a selection of concepts that are further described below in the Detailed Description. This summary is not intended to identify key features or essential features of the claimed subject matter, and is not intended to be used to limit the scope of the claimed subject matter.

In an embodiment, a method of seamlessly providing a real-time media stream to one or more electronic devices on-board a vehicle is implemented by an on-board system of the vehicle. The method includes receiving a real-time media stream that is multicast by a remote computing system. The method also includes, while receiving portions of the real-time media stream, packaging the real-time media stream into a plurality of time-delineated media segments, inputting the plurality of time-delineated media segments into a buffer, identifying, after a signal loss event, one or more missing time-delineated media segments, causing a request for the one or more missing time-delineated media segments to be sent to the remote computing system, receiving the one or more missing time-delineated media segments from the remote computing system via a unicast transmission, inserting the one or more missing time-delineated media segments into the buffer in sequence with the plurality of time-delineated media segments, and causing the buffered real-time media stream, including the inserted one or more missing time-delineated media segments, to be provided to the one or more electronic devices on-board the vehicle. The buffer delays the real-time media stream by a buffer time value that is equal to or greater than a duration of N of the time-delineated media segments, where N is an integer greater than or equal to one.

In another embodiment, an on-board system for seamlessly providing real-time media streams to one or more electronic devices on-board a vehicle carrying the on-board system includes one or more processors and one or more non-transitory, tangible computer-readable storage media. The one or more non-transitory, tangible computer-readable storage media store computer-executable instructions that, when executed by the one or more processors, cause the on-board system to receive a real-time media stream that is multicast by a remote computing system and, while receiving portions of the real-time media stream, package the received real-time media stream into a plurality of time-delineated media segments, input the plurality of time-delineated media segments into a buffer, identify, after a signal loss event, one or more missing time-delineated media segments, cause a request for the one or more missing time-delineated media segments to be sent to the remote computing system, receive the one or more missing time-delineated media segments from the remote computing system via a unicast transmission, insert the one or more missing time-delineated media segments into the buffer in sequence with the plurality of time-delineated media segments, and cause the buffered real-time media stream, including the inserted one or more missing time-delineated media segments, to be provided to the one or more electronic devices on-board the vehicle. The buffer delays the real-time media stream by a buffer time value that is equal to or greater than a duration of N of the time-delineated media segments, where N is an integer greater than or equal to one.

In another embodiment, a method of seamlessly providing a real-time media stream at least to one or more electronic devices on-board a first vehicle of a plurality of vehicles is implemented by a computing system located remotely from the plurality of vehicles. The method includes encoding a real-time media stream, at least in part by generating metadata indicating boundaries between segments of the real-time media stream. The method also includes, while encoding portions of the real-time media stream, packaging a first copy of the encoded real-time media stream into a plurality of time-delineated media segments, caching a sliding window of N segments of the plurality of time-delineated media segments, causing a second copy of the encoded real-time media stream to be transmitted to the plurality of vehicles via a multicast transmission, receiving, from the first vehicle and after a signal loss event, a request for one or more missing time-delineated media segments, retrieving the one or more missing time-delineated media segments from among the cached N segments, and causing the retrieved one or more missing time-delineated media segments to be transmitted to the first vehicle via a unicast transmission. Packaging the first copy of the encoded real-time media stream into the plurality of time-delineated media segments includes segmenting the real-time media stream according to the boundaries indicated by the metadata. N is an integer greater than or equal to one.

DETAILED DESCRIPTION OF THE PREFERRED EMBODIMENTS

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
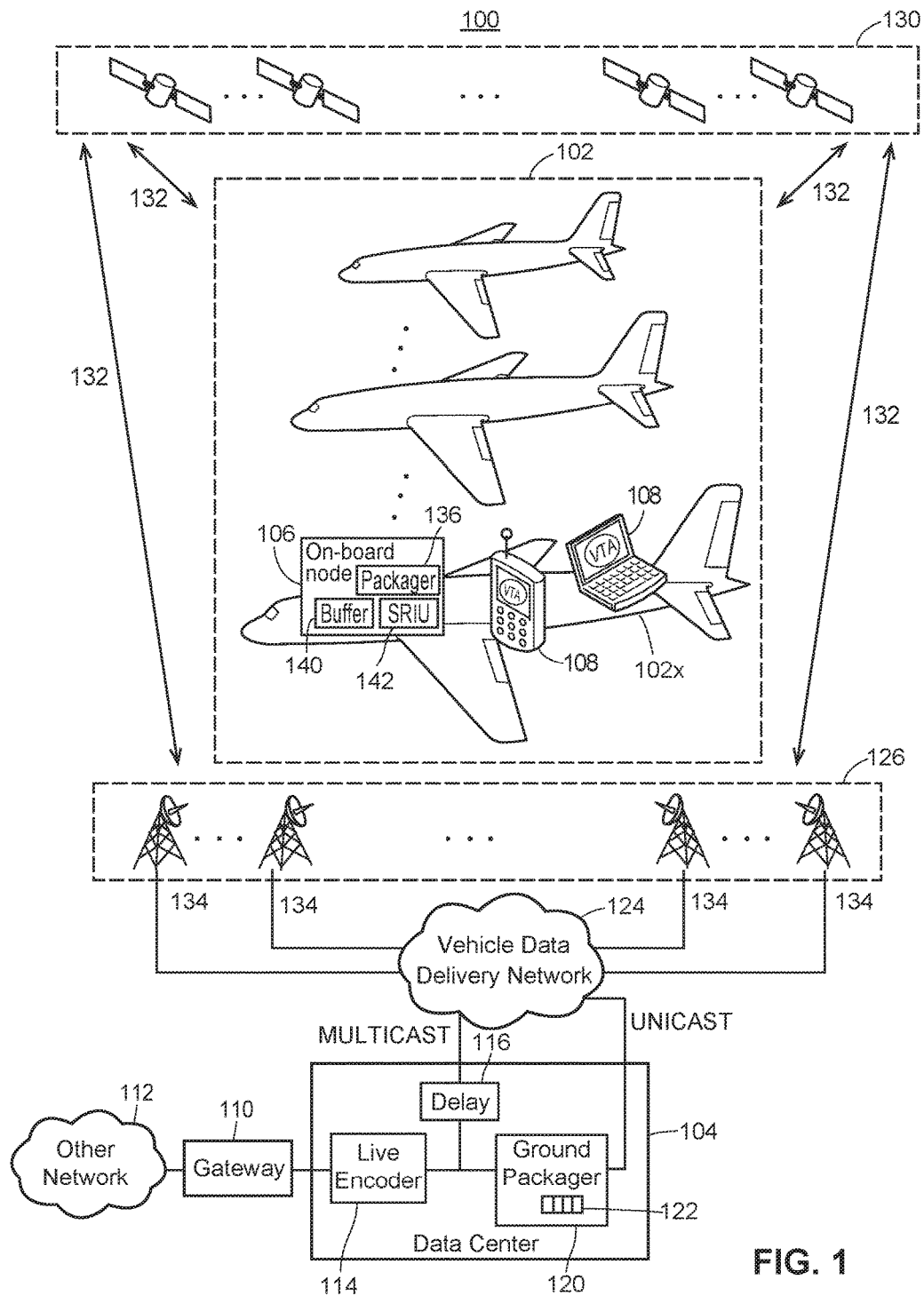
FIG. 1 is a block diagram of an exemplary content provision system for seamlessly delivering real-time media streams to electronic devices that are on-board various vehicles.

FIG. 1 is a block diagram depicting an exemplary content provision system 100 for seamlessly delivering real-time media streams to electronic devices that are on-board (e.g., being transported by) a number of vehicles 102. As described in further detail below, the system 100 includes a data center 104 that is generally configured to multicast real-time media streams to the vehicles 102, and to unicast missing segments of the media streams to specific ones of the vehicles 102 that experience signal loss events. As used herein, the terms "signal loss" and "connectivity loss" may be used interchangeably, and may, in some implementations and/or scenarios, refer to a degradation of the signal rather than a complete loss of signal (e.g., if the signal passes below a threshold signal-to-noise or signal-to-interference-plus-noise ratio for at least some threshold amount of time, and/or if some other quality of service metric is not achieved). In a preferred embodiment, however, "signal loss" or "connectivity loss" refers to a complete loss of signal, such as the loss of signal that occurs during a satellite or satellite spot beam handoff.

Each of the vehicles 102 is equipped with an on-board system 106 (e.g., as depicted within vehicle 102x in FIG. 1) that is generally configured to buffer a multicast, real-time media stream, package it into time delineated media segments on boundaries identified by metadata present in the real-time stream, identify any media segments that are missing from the media stream (e.g., segments that were not properly received), request the missing media segments (if any) from the data center 104, receive the requested media segments via a unicast transmission from the data center 104, and insert the missing media segments into the media stream at the appropriate buffer locations. In this manner, the real-time media stream may be reconstructed and provided to entertainment devices 108 transported by the vehicles 102 (e.g., as depicted within the vehicle 102x in FIG. 1) in a seamless manner, e.g., such that end users are unaware of any gap in connectivity during the received multicast.

One or more of the vehicles 102 may be owned and/or operated by a specific individual. In some cases, one or more of the vehicles 102 may be owned and/or operated by a company, organization or government entity. For example, the vehicles 102 may include a fleet of vehicles that are used to transport passengers who pay for or otherwise are granted passage on one of the vehicles of the fleet. The vehicles 102 may include one or more vehicles that are used by an organization to transport employees and their guests, in some situations. One or more of the vehicles 102 may be used to transport live or inanimate cargo, packages, mail, and/or other types of cargo. It is noted that although FIG. 1 depicts the vehicles 102 as being airplanes, the techniques and principles described herein equally apply to other types of vehicles such as trucks, automobiles, busses, trains, boats, ships, barges, subway cars, helicopters or other types of aircraft, ambulances or other emergency vehicles, military vehicles, other air-borne, water-borne, or land-borne vehicles, and vehicles that are suitable for space travel.

The entertainment devices 108 may be devices that are temporarily being transported by the vehicles 102 (e.g., seatback monitors, smart phones, tablets, laptops and/or other mobile computing devices) and are part of or belong to passengers and/or crew on-board the vehicles 102. In an embodiment, each of the entertainment devices 108 is a computing device including at least one memory, at least one processor, at least one user interface, and at least one wired and/or wireless network interface. In some implementations, the real-time media streams are instead, or additionally, provided to other devices carried by the vehicles 102, such as components of integrated subsystems that each include a large display screen to be simultaneously viewed by multiple passengers.

Each real-time media stream may include video (e.g., one or more IPTV programs, including audio), or audio only (e.g., a live podcast or radio show), for example. As used herein, "real-time" content/media encompasses "near-real-time" content/media, i.e., where some perceivable amount of intentional time delay (e.g., 30 seconds, or 90 seconds, etc., due to buffering) and/or other time delay (e.g., a much smaller delay due to processing and over-the-air propagation time) is introduced between the time of transmission and the time of presentation to end users.

The data center 104 may be located at least partially in a terrestrial environment, e.g., in one or more stationary buildings or structures. For example, one or more portions of the data center 104 may be included in a ground distribution network. In an embodiment, at least a portion of the data center 104 may be located in a non-terrestrial environment, e.g., on a satellite or space station. In an embodiment, the data center 104 may include multiple data centers for servicing different sources of content, different customers, different geographical areas, and/or any other desired or suitable differentiations.

The data center 104 may be communicatively connected via a gateway 110 to another network 112. Generally, the gateway 110 may include one or more computing devices in communicative connection, and may serve as a boundary between the rest of the content provision system 100 and the other network 112. In some embodiments, at least a portion of the gateway 110 may be included in the data center 104. The other network 112 in communicative connection with the gateway 110 may include, for example, the Internet, a PSTN (Public Switched Telephone Network), and/or one or more other public networks. Additionally or alternatively, the other network 112 may include one or more Wide Area Networks (WAN). The network 112 may include any number of wired and/or wireless networks, such as TV Receive Only (TVRO) sitcom networks (e.g., Ku-band, C-band). Although FIG. 1 illustrates the data center 104 as being connected to one other network 112 via one gateway 110, the techniques and principles described herein equally apply to content provision systems 100 having and/or being in communicative connection with any desired number of other networks 112 via any number of gateways 110. In some embodiments of the content provision system 100, the gateway 110 is omitted.

In one implementation, the other network 112 provides to the data center 104 (e.g., via the gateway 110, or via another route) data representing a real-time media stream that is ultimately to be delivered to some or all of the entertainment devices 108 on-board some or all of the vehicles 102. In one implementation, the other network 112 is communicatively connected to a server of a streaming media provider (e.g., an IPTV provider), not shown in FIG. 1, that provides the real-time media stream to the data center 104. While other protocols may be used, in some implementations, the real-time media stream may be sent/pushed to the data center 104 using UDP (User Datagram Protocol) in order to prioritize timely delivery over reliability.

The data center 104 includes a live encoder 114, a delay unit 116 and a ground packager 120. In some implementations, the live encoder 114, delay unit 116 and/or ground packager 120 are located remotely from each other (e.g., if data center 104 includes multiple data centers or components distributed across a large geographic area). Alternatively, the live encoder 114, delay unit 116 and ground packager 120 may all be co-located, and/or included within a single server or other computing device.

Generally, the live encoder 114 encodes the real-time media stream (received from the other network 112) as the data of the media stream is received. The encoding process may generate metadata that indicates how the media stream should be segmented by downstream packagers. In one implementation, for example, the live encoder 114 embeds markers within the real-time media stream (e.g., within the UDP stream). The markers, embedded at specific time offsets, may indicate desired boundaries between consecutive media "segments," and specify unique identifiers for each segment (e.g., "0001," "0002," etc., or some other suitable labeling scheme), for example. In a preferred implementation, the markers inserted by the live encoder 114 in the UDP (or other protocol) media stream are modified versions of the data structure defined by the CableLabs® Encoder Boundary Point (EBP) specification. Currently, the EBP specification describes a data structure that may be inserted in a stream at points where boundaries are desired, and defines a number of general-purpose extension fields. In this preferred implementation, the content and duration of each segment are defined by the placement of the EBP data structures/markers, and at least one extension field of each of the EBP data structures/markers specifies the unique identifier for the respective segment. In other implementations, different suitable techniques (e.g., non-EBP approaches) may be used to indicate boundaries, indicate durations, and/or specify unique segment identifiers.

The live encoder 114 may output the marked, real-time media stream using the same general protocol or format in which the stream was received from the other network 112 (e.g., UDP). The data center 104 may direct the encoded real-time media stream output by the live encoder 114 along two paths. A first path from the live encoder 114 is directed to the ground packager 120, which generates time-delineated media segments based on the segmentation markers (and/or other metadata) added by the live encoder 114. In particular, in one implementation, the ground packager 120 generates media segments aligning (content-wise) with the embedded boundary markers, and names the media segments based on the unique segment identifiers present in the markers. The ground packager 120 may package the real-time media stream into segments according to any protocol suitable for delivery to the entertainment devices 108 via a delivery mechanism available on the vehicles 102 (e.g., WiFi delivery, as discussed further below in connection with FIG. 2). For example, the ground packager 120 may package the real-time media into segments using MPEG's Dynamic Streaming over HTTP (DASH) protocol, Adobe's HTTP Dynamic Streaming (HDS) protocol, or Apple's HTTP Live Streaming protocol.

The ground packager 120 may store the packaged media segments in a cache 122, which maintains a sliding window of N packaged segments (N being an integer greater than zero). The data center 104 may delete old media segments as needed based on the maximum buffer size. The maximum buffer size and the value of N may be configured to be exceed the maximum duration of signal loss that is anticipated for some or all of vehicles 102 receiving the multicast stream, as discussed further below.

A second path from the live encoder 114 is directed to the delay unit 116, which contains a buffer that delays the real-time media stream by a predetermined amount of time. The delay unit 116 may be configured to delay the encoded media stream by an amount of time that is equal to or greater than the duration of one media segment, or by another suitable length of time. The delay may be set to a level that ensures segments will be present in the cache 122 of the ground packager 120 before those same segments could possibly be needed by any of the vehicles 102. In the example system 100, the data center 104 multicasts the encoded and delayed real-time media stream to the vehicles 102 via a vehicle delivery network 124, a number of teleporters 126, and a number of satellites 130.

The vehicle data delivery network 124 may include one or more packet network routers, optical switches, and/or other network elements, and may be at least partially disposed in a terrestrial location (e.g., within a climate-controlled structure). In an embodiment, at least a portion of the vehicle data delivery network 124 may be disposed in a non-terrestrial location (e.g., a routing node disposed on a satellite). The vehicle data delivery network 124 may include a public network, a private network, or some combination of one or more public networks and one or more private networks. The vehicle data delivery network 124 may include a communications network, a data network, a packet network, or some combination thereof. Moreover, the vehicle data delivery network 124 may include a hosted network, and/or a peer-to-peer or other type of ad-hoc network. Generally, the vehicle data delivery network 124 may use any known networking technology or combination(s) thereof for delivering data. For example, the vehicle data delivery network 124 may use any known networking technology or combination(s) thereof for delivering data between the teleporters 126 and the data center 104. Generally, the vehicle data delivery network 124 may include a plurality of computing devices that are communicatively connected.

Each of the vehicles 102 may be communicatively connected to the data center 104 via one of a number of satellite links 132, and one of a number of communication paths 134, at any given time (e.g., other than during periods of connectivity loss, such as during satellite handoff). The satellite links 132 may be collectively supported by one or more radio frequency (RF) bands. For example, the satellite links 132 may make use of the L band (e.g., 40 to 60 GHz or 1 to 2 GHz), the $K_u$ band (e.g., 12-18 GHz), the $K_a$ band (e.g., 26.5-40 GHz), and/or other spectrum that is allocated for satellite communications. Generally, each frequency band may include one or more channels. The channels may be formed, defined or allocated by frequency division, time division, code division, some other suitable channel division, or some combination of divisions. Signals that are carried on a channel may or may not be multiplexed. Any one or more channels included in a frequency band may support (or may be designated to support) a forward link and/or a reverse link for wireless communications. Additionally, any one or more of the channels included in a frequency band may be used to deliver signaling, data payload, or a combination of signaling and data payload. For example, a particular frequency band may support an in-band protocol in which signaling and payload are transmitted over a same channel within the band, and/or the particular frequency band may support an out-of-band protocol in which the signaling and payload are respectively transmitted over different channels within the band.

As described further below in connection with FIG. 2, each of the vehicles 102 may include a satellite transceiver or modem and one or antennas to enable communications via one of satellite links 132. Similarly, a satellite transceiver or modem that is fixedly connected to one of the teleporters 126 may serve as the other end of the satellite link 132 over which data is received onto and/or sent from the vehicles 102. The teleporters 126 that support the non-vehicle end of the satellite links 132 may include or be mounted on, for example, entirely stationary terrestrial structures such as buildings or towers on the ground, or relatively stationary terrestrial structures such as barges in an ocean. In some instances, a single one of the teleporters 126 may include multiple transceivers or modems, each of which may be tuned to a different frequency band.

In addition to having a satellite transceiver or modem supporting one end of a particular satellite link 132 to one of the vehicles 102, each of the teleporters 126 may include another interface for communicatively connecting to the data center 104 via one of the communication paths 134. The interface to the communication path 134 may include a wired or a wireless communications interface.

The delayed and multicast real-time media stream is received by the on-board node 106 of each of the vehicles 102. The manner in which each on-board node 106 may receive the delayed, multicast media stream is discussed further below in connection with FIG. 2. Each on-board node 106 includes a packager 136, a buffer 140 and a segment retrieval and insertion unit 142. As the delayed media stream is received by a respective on-board node 106, the packager 136 generates time-delineated media segments based on the segmentation markers (and/or other metadata) inserted by the live encoder 114. In particular, in one implementation, the packager 136 generates media segments aligning with the embedded boundary markers, and names the media segments based on the unique segment identifiers specified in the markers. The packager 136 packages the received real-time media stream (e.g., the UDP stream) into segments according to the same protocol used by the ground packager 120 (e.g., DASH, HDS, HTTP Live Streaming protocol, etc.).

As the packaged media stream is generated, the on-board node 106 stores the packaged media segments in the buffer 140. The packager 136 may operate similarly or identically to ground packager 120, for example, such that the packaged media segments stored in the buffer 140 precisely match the packaged media segments stored in the cache 122 of ground packager 120, but in a delayed manner due to the delay unit 116 and any differences in transmission/processing times.

Each on-board node 106 may provide the buffered segments of the received media stream to one of more entertainment devices 108 of the respective vehicle 102, at which point the entertainment devices 108 may consume the segments (i.e., present the real-time video and/or other media to users of the entertainment devices 108). The delay of the buffer 140 may be at least as long as the maximum duration of signal loss that is anticipated for some or all of vehicles 102 receiving the multicast stream, as discussed further below. In one implementation, the size/delay of the buffer 140 is designed to be equal to the size/delay of the buffer in the cache 122 in ground packager 120.

As indicated above, certain signal loss events may be somewhat predictable, and may have somewhat predictable durations and/or frequencies of occurrence. For example, it is well known that a handoff between two spot beams of a single satellite is a "break-then-make" process that causes up to about 10 seconds of connectivity loss for an aircraft. Similarly, it is well known that a handoff between two satellites is a "break-then-make" process that causes about 30 to 90 seconds of connectivity loss for an aircraft. Thus, assuming that relatively long inter-satellite handoffs are expected (or, at least, are accounted for as a worst case scenario), both the buffer 140 and the cache 122 may buffer at least 90 seconds of packaged media segments (e.g., at least nine segments if each segment is 10 seconds long, etc.). In other implementations, the buffer lengths may be longer or shorter (e.g., 30 seconds, 120 seconds, etc.).

When a handoff or other signal loss event occurs for a particular one of the vehicles 102, that vehicle 102 will fail to correctly receive the portion of the multicast stream, multicast by the data center 104, which comprises one or more media segments. Thus, the packager 136 of that vehicle 102 will not be able to produce the corresponding packaged media segments for storage in the buffer 140. Meanwhile, the ground packager 120 will (typically) not be subject to any connectivity problems, and therefore will continue to produce packaged media segments for storage in the cache 122. When the handoff or other signal loss event is complete, the vehicle 102 resumes receiving the multicast media stream, and the packager 136 resumes packaging the stream into time-delineated media segments. However, any media segments corresponding to the portion of the media stream that was multicast during the signal loss event will be missing from the buffer 140.

To remedy this, the segment retrieval and insertion unit 142 of the vehicle 102 experiencing the signal loss event identifies which media segments are missing/needed, requests those signals from the ground packager 120, and inserts the missing media segments into the buffer 140 (in proper order) after receiving the segments from the data center 104 via a unicast transmission. To first identify which media segments are missing, the segment retrieval and insertion unit 142 may analyze the unique segment identifiers within the UDP (or other protocol) media stream (received from the live encoder 114 via the delay unit 116) as the media stream is received. If the segment identifiers are arranged as sequential numbers (e.g., "0001" for the first segment, "0002" for the second segment, etc.), for instance, the segment retrieval and insertion unit 142 may identify missing media segments by continually comparing identifiers in successive markers (i.e., the identifiers specified by the i-th and (i+1)-th markers in the received stream) and flagging missing media segments whenever the difference is greater than one. In such a scenario, the segment retrieval and insertion unit 142 may identify the first missing media segment as being the media segment having an identifier that is one greater than the identifier of the segment corresponding to the i-th marker, and the last missing media segment (of a contiguous block of segments) as being the media segment having an identifier that is one less than the identifier of the segment corresponding to the (i+1)-th marker. If successive markers in the received media stream include segment identifiers of "0052" and "0058," for example, the segment retrieval and insertion unit 142 may identify media segments "0053" through "0057" as the missing segments for that particular signal loss event. In other implementations, different suitable techniques are used. For example, in a less preferred embodiment, the on-board node 106 may include a timer, and may calculate the number of missing media segments based on the amount of time in which no signal is received, the locations of embedded boundary markers in the media stream, and the known duration of each media segment.

After the missing segment(s) is/are identified, the segment retrieval and insertion unit 142 may utilize the newly restored satellite connectivity to request the missing media segment(s) from the ground packager 120, which will by that time have stored (in the cache 122) a number of recent media segments each packaged according to the appropriate protocol, as described above. The request may include the unique identifier for each media segment being requested (or, alternatively, the unique identifier for only the first missing media segment, along with a total count of the number of consecutive media segments that are needed, etc.). The request may be sent to the ground packager 120 via one of the satellite links 132 and one of the communication paths 134, for example. In response, the ground packager 120 may deliver the identified media segment(s) to the on-board node 106 via a unicast transmission specifically targeted/addressed to the vehicle 102 that sent the request (e.g., using a communication path 134 and satellite link 132, but in the reverse direction). Note that this unicast transmission, unlike the original real-time multicast transmission, is not bound to the data rate of the original multicast transmission. The unicast transmission may be transmitted to the vehicle 102 at any data rate equal to or greater than the data rate of the multicast transmission. The segment retrieval and insertion unit 142 may fetch the missing media segment(s) from the ground packager 120 using a unicast HTTP interface provided by a computing device of the ground packager 120, or another computing device of the data center 104, for example.

Upon receiving the missing media segment(s) that was/were previously packaged by the ground packager 120, the segment retrieval and insertion unit 130 inserts the media segment(s) into the buffer 140 in the proper order (e.g., sequentially according to segment name). The media segments are then presented to the end users of the entertainment devices 108 (of the vehicle 102 that experienced the signal loss event) in the buffered order. The entertainment devices 108 may fetch new media segments as needed to provide a continuous display or other presentation to the respective users, for example. Provided that the handoff or other signal loss event does not last longer than the time it takes for a media segment to pass through the buffer 140, plus the time needed for requesting, receiving and inserting any missing media segments, the entertainment devices 108 should be able to continuously read from the buffer 140 and present the real-time media stream to the end users in a seamless manner.

It is understood that other alternatives, beyond those described above and/or shown in FIG. 1, are also possible. As noted above, for example, the vehicles 102 may be vehicles other than airplanes. Moreover, the links 132 may be other types of links (i.e., non-satellite links) that are subject to intermittent signal loss events, and/or the unicast of missing media segments may be requested and/or made via another type of link (e.g., via an air-to-ground (ATG) link).

Figure 2:
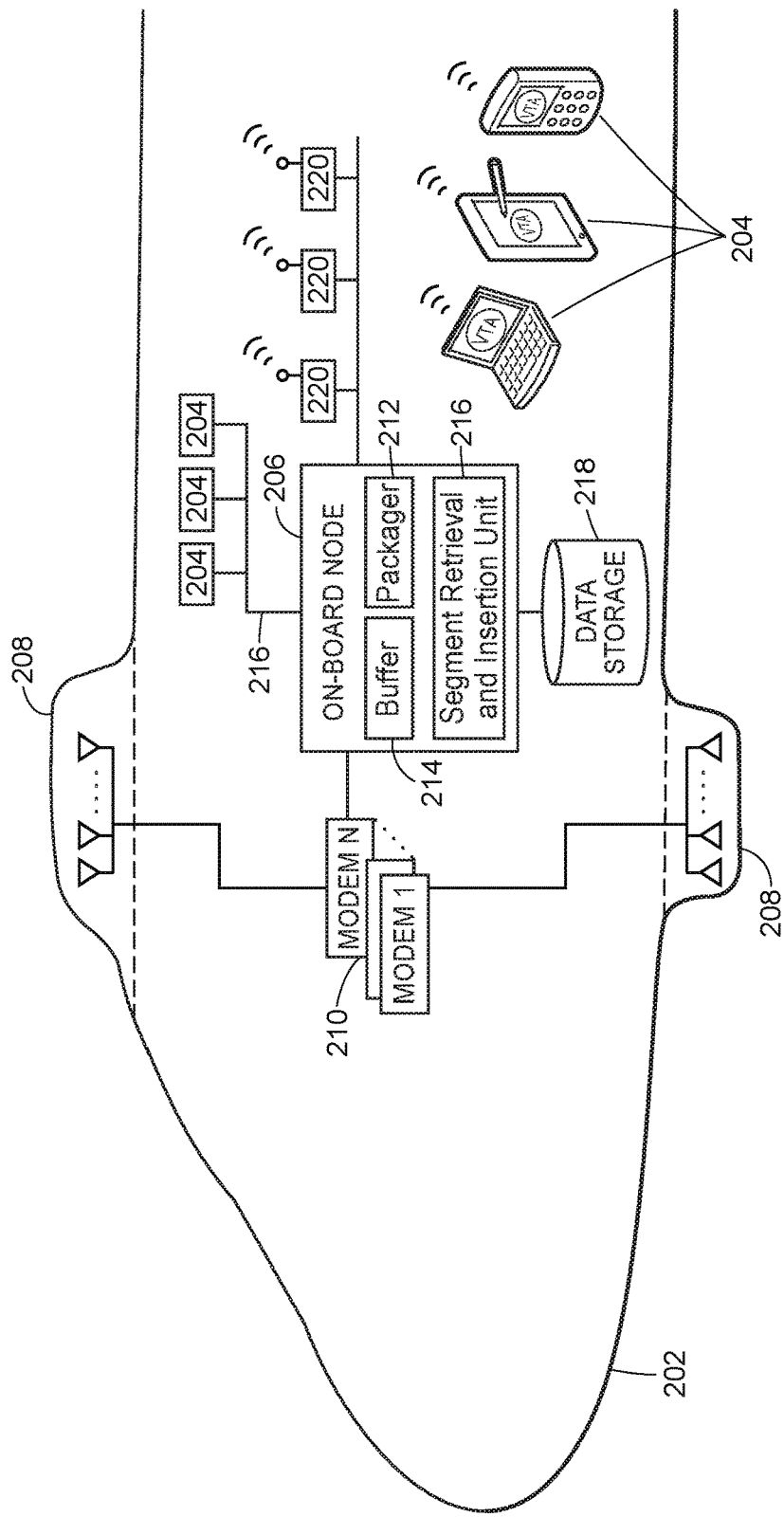
FIG. 2 is a block diagram of an exemplary on-board system, contained within a vehicle, that is configured to receive real-time media streams and deliver the received real-time media streams to one or more electronic devices that are on-board the vehicle.

FIG. 2 illustrates an example on-board system 200 of a vehicle 202, according to one implementation. The on-board system 200 may generally cause real-time media streams to be provided, in a seamless manner, to one or more entertainment devices 204 being transported by the vehicle 202. In an embodiment, the vehicle 202 is the vehicle 102x of FIG. 1, and the entertainment devices 204 are the entertainment devices 108 depicted within the vehicle 102x.

The example on-board system 200 includes an on-board node 206, such as an Airborne Control Processor Unit (ACPU) or other computing device(s). The on-board node 206 is communicatively connected to one or more external communication links via one or more antennas 208 and one or more modems or transceivers 210. In an embodiment, the on-board node 206 may be the on-board node 106 of FIG. 1, and may include an instance of the packager 136, the buffer 140 and the segment retrieval and insertion unit 142 (represented in FIG. 2 by the blocks 212, 214 and 216, respectively).

Each of the antennas 208 may receive and transmit signals via a frequency band allocated for satellite communications, e.g., the $K_a$ band, the L band, the $K_u$ band, and/or any other suitable frequency band(s). Each of the antennas 208 may be communicatively connected to an associated one of the modems or transceivers 210. The modems or transceivers 210 may be fixedly connected to the vehicle 202 and configured to encode and decode information and data corresponding to signals at the respective antenna 208, in one implementation.

The entertainment devices 204 may be capable of establishing wireless communicative connections with the on-board node 206 via one or more wireless access points 220, e.g., via wireless network interfaces (e.g., WiFi interfaces) of the entertainment devices 204. In an embodiment, each of the entertainment devices 204 may include an instance of a vehicle travel application (VTA) installed thereon and particularly configured to support services while the entertainment device 204 is being transported by the vehicle 202, e.g., when the vehicle 202 is traveling en route between ports. For example, the vehicle travel application may be configured to serve as the on-board end of a data tunnel that is established with the data center 104. In an embodiment, the vehicle travel application may communicate with other applications installed on a particular entertainment device 204 (e.g., native terrestrial applications) so that the other applications may operate as desired (e.g., in a native manner) while the entertainment device 204 is being transported by the vehicle 202.

Figure 3:
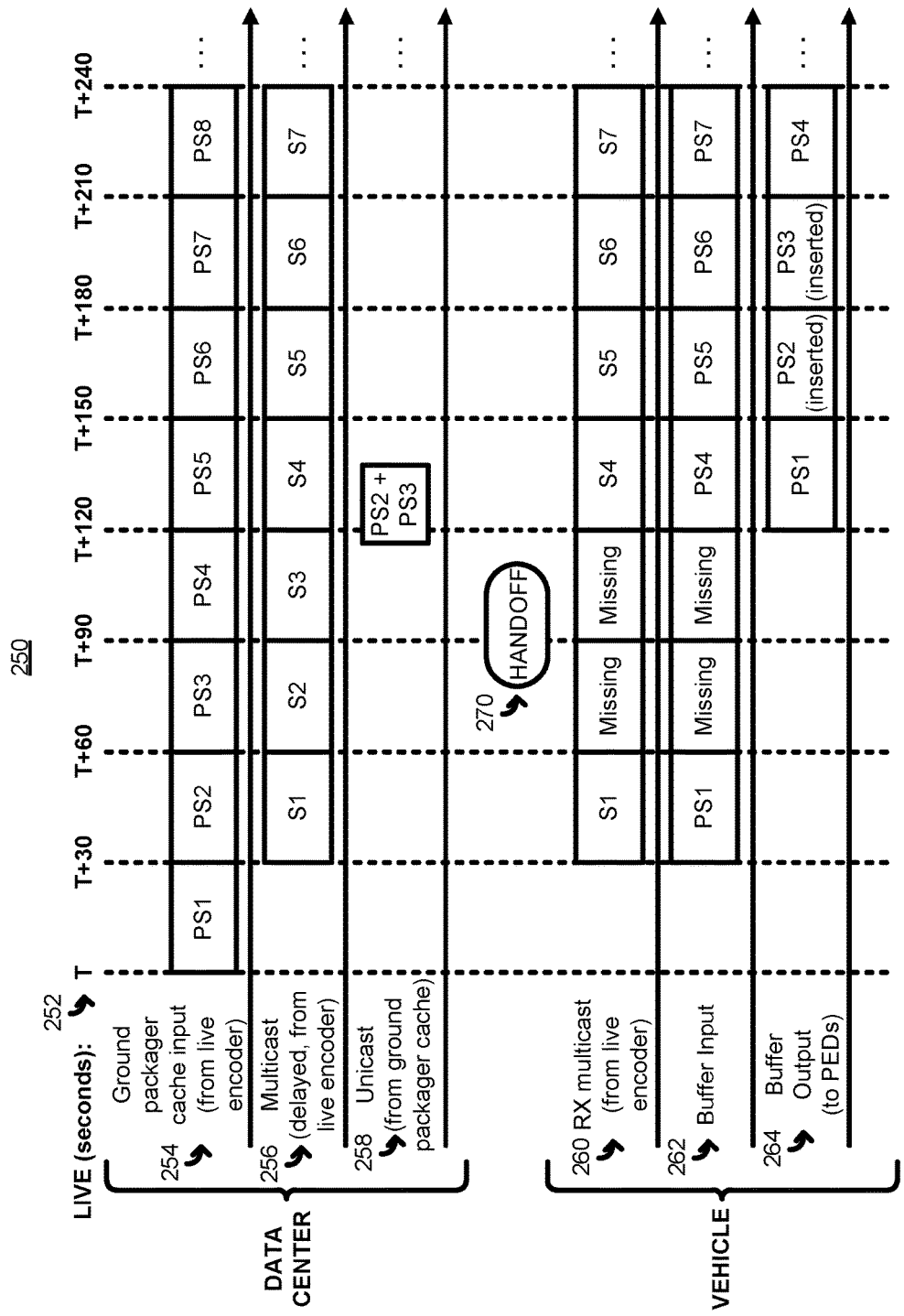
FIG. 3 illustrates an exemplary time sequence depicting the manner in which a real-time media stream is seamlessly provided to one or more electronic devices on-board a vehicle despite being interrupted by a handoff.

FIG. 3 illustrates an exemplary time sequence 250 depicting the manner in which a real-time media stream is seamlessly provided to one or more electronic devices on-board a vehicle despite being interrupted by a handoff, according to one implementation. The time sequence 250 may correspond to events taking place within the content provision system 100 of FIG. 1, and are described below with reference to the elements of FIG. 1.

Horizontally across the top of FIG. 3, a timeline 252 shows the number of seconds elapsed starting from a time T. In FIG. 3, in order to better illustrate the delays between various operations, T represents the time when the real-time media first starts streaming. The rows in the time sequence 250 represent the timing with which media segments are transmitted, received, input or output at a particular element of the content provision system 100 (i.e., depending on the context, as indicated by the text by each row). In FIG. 3, "Sx" refers to the portion of the real-time media stream corresponding to the x-th media segment (e.g., a UDP stream encoded by the live encoder 114, before packaging by either the packager 136 or the ground packager 120), and "PSx" refers to the x-th packaged media segment (e.g., after packaging by the packager 136 or the ground packager 120 using DASH or another suitable protocol). It is to be understood that FIG. 3 is somewhat simplified in order to facilitate understanding of the concepts being described, and therefore does not show, for example, offsets due to differences in processing or transmission times. Moreover, while FIG. 3 depicts media segments that are 30 seconds long for ease of illustration, the media segments are preferably shorter (e.g., 10 seconds, or 8 seconds, 5 seconds, etc.).

As seen in FIG. 3, rows 254, 256 and 258 correspond to operations at the data center 104 (e.g., at one or more ground stations), whereas rows 260, 262 and 264 correspond to operations on-board one of the vehicles 102 (e.g., on-board an airplane). At the data center 104, row 254 represents the packaged media segments that are input to the cache 122 of the ground packager 120, row 256 represents the media stream that is multicast by the data center 104 (after encoding by the live encoder 114 and buffering by the delay unit 116), and row 258 represents the packaged media segments that are unicast by the data center 104 after being retrieved from the cache 122. At the vehicle 102, row 260 represents the multicast media stream that is received by the on-board node 106, row 262 represents the packaged media segments that are input to the buffer 140, and row 264 represents the packaged media segments that are retrieved/output from the buffer 140 for consumption by the entertainment devices 108.

As seen in row 254, the cache 122 at the ground packager 120 begins buffering packaged media segments at time T. As seen in rows 256 and 260, in this particular embodiment, the real-time media stream from the live encoder 114 is multicast after a delay of 30 seconds (i.e., after the delay unit 116 delays the media stream by the duration of a single segment), and received by the on-board node 106 via one of the satellite links 132. As seen in row 262, the multicast media stream is packaged and input to the buffer 140 as the corresponding portions of the media stream are received. As seen in row 264, packaged segments are output from the buffer 140 after the buffer 140 has introduced a further delay of 90 seconds (i.e., the duration of three segments). Thus, the buffer 140 is designed to accommodate signal outages of up to 90 seconds, in this particular implementation. The cache 122 may also store a sliding window of three segments, in this implementation.

At a time between approximately T+80 and T+110 seconds, a handoff 270 occurs, causing a loss of connectivity between the data center 104 and the on-board node 106. The handoff 270 may be a handoff between two of the satellites 130, for example. In other implementations and/or scenarios, the handoff 270 may be a different type of signal loss event (e.g., an intermittent, strong interferer that causes a quality of service metric to fall below a threshold value, etc.). Due to the handoff 270, the media stream portions S2 and S3 are not received by the on-board node 106, and therefore the corresponding segments PS2 and PS3 are not generated by the packager 136 or input to the buffer 140 (as seen in rows 260 and 262). While shown as being "missing" in their entireties, the media stream portions S2 and S3 may be partially received (e.g., before and/or after the handoff 270). In some implementations, however, any portion of the media stream that corresponds to a fractional segment is discarded if the portion corresponding to the remainder of that segment is not properly received.

Once connectivity is restored, the segment retrieval and insertion unit 142 identifies segments PS2 and PS3 as the missing segments (e.g., by comparing the unique identifiers of the successive, fully-received media stream portions S1 and S4), and requests those missing segments from the data center 104 in an operation not shown in FIG. 3. In response, the data center 104 retrieves the packaged segments PS2 and PS3 from the cache 122 of the ground packager 120, and delivers PS2 and PS3 to the vehicle 102 via a unicast transmission as shown in row 258. As seen in FIG. 3, the missing segments may, in some implementations, be unicast more quickly (i.e., at a higher data rate) than the multicast transmission would provide the corresponding portions of the real-time media stream. Upon receiving the packaged segments PS2 and PS3, the segment retrieval and insertion unit 142 inserts those segments into the buffer 140, in the proper sequence (e.g., as determined based on the segment names for PS2 and PS3) and prior to outputting those segments to the entertainment devices 108 as seen in row 264. Because the buffer output 264 has no missing segments, the presentation to each of the entertainment devices 108 may be seamless, with the end user being unaware that the handoff 270 or any loss of connectivity occurred.

Figure 4:
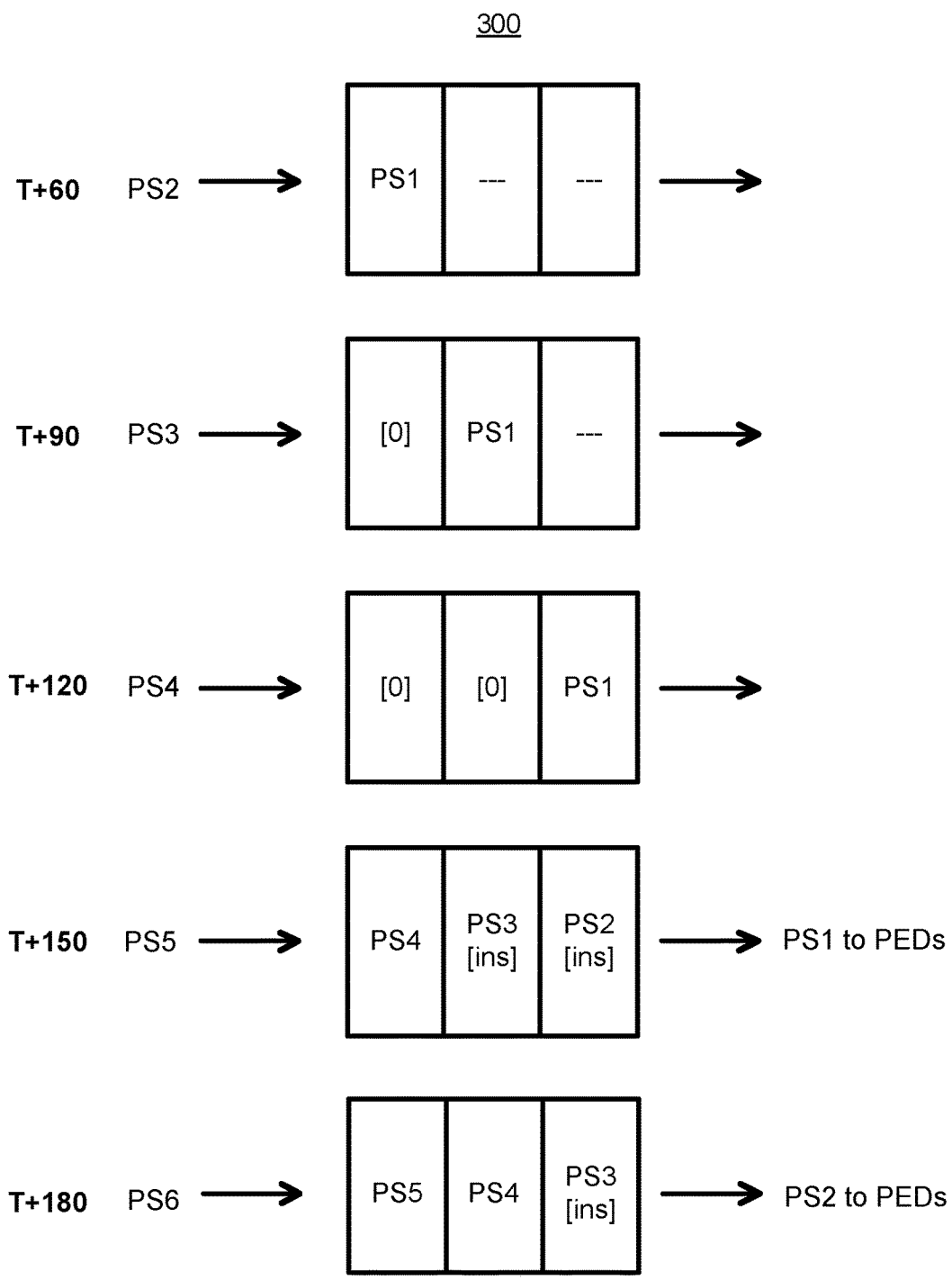
FIG. 4 illustrates exemplary contents of the buffer of the on-board node of FIG. 1, at various different times represented in the example time sequence of FIG. 3.

To provide a further understanding of the time sequence 250 shown in FIG. 3, FIG. 4 illustrates exemplary contents 300 of the buffer 140 of the on-board node 106, at various different times represented in the time sequence 250. FIG. 4 illustrates an implementation in which the buffer 140 is a first-in-first-out (FIFO) buffer storing up to three packaged media segments. For each snapshot-in-time of the contents 300, the left-most block represents the most recently added media segment, and the right-most block represents the oldest media segment that has not yet been retrieved (for consumption by the entertainment devices 108) and deleted from the buffer 140.

As seen in FIG. 4, the first packaged segment PS1 has been fully input to the buffer 140 at the time T+60. While the second packaged segment PS2 would be expected to be fully input by the time T+90, however, the handoff 270 of FIG. 3 results in a missing segment (depicted as "[0]" in FIG. 4). Similarly, while the third packaged segment PS3 would be expected to be fully input by the time T+120, the handoff 270 results in another missing segment. Due to the restoration of connectivity prior to the time T+120, the fourth packaged segment PS4 is fully received and input to the buffer by the time T+150. Moreover, upon restoring connectivity at approximately T+110 and after identifying the missing segments PS2 and PS3, the request/reception/insertion of the missing segments takes place, such that the segments may be inserted (in the proper order) in the buffer 140 by the time T+150. By the time T+180, the first inserted segment PS2 has been output for consumption by the entertainment devices 108 on the vehicle experiencing the handoff 270, and the second inserted segment PS3 is in line to be output next. In other implementations, the timing of the contents 300 within the buffer 140 may differ somewhat from what is shown in FIG. 4. For example, the segment PS3 may not be inserted into the buffer 140 until a time between T+150 and T+180.

Figure 5:
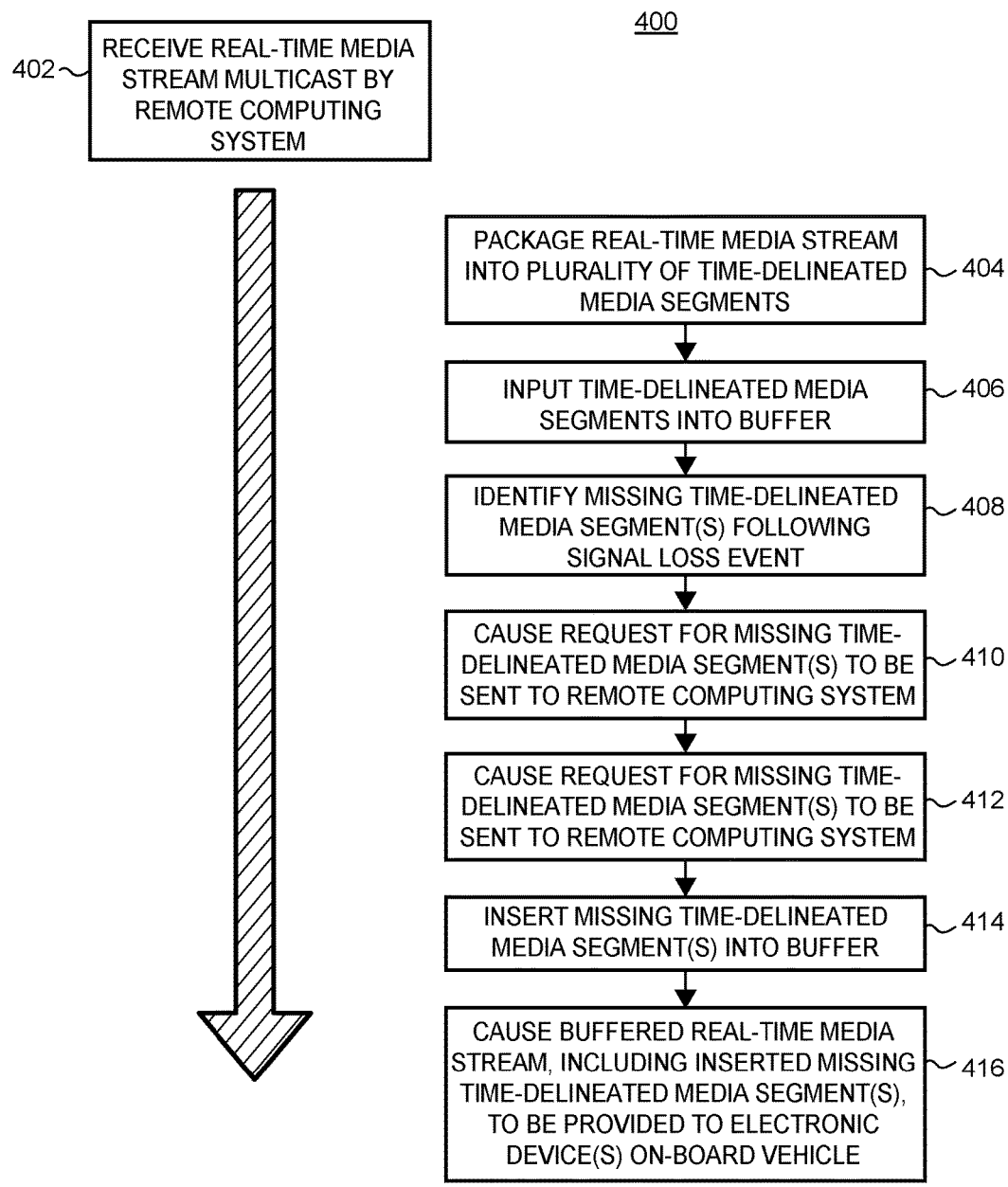
FIG. 5 illustrates an exemplary method, implemented by an on-board node of a vehicle, of seamlessly providing a real-time media stream to one or more electronic devices on-board the vehicle.

FIG. 5 illustrates an exemplary method 400, implemented by an on-board node such as the on-board node 106 of FIG. 1 or the on-board node 206 of FIG. 2, of seamlessly providing a real-time media stream to one or more electronic devices on-board a vehicle (e.g., one or more of the entertainment devices 108 on-board the vehicle 102x of FIG. 1 or the entertainment devices 204 on-board the vehicle 202 of FIG. 2). The real-time media stream may be a video stream (e.g., IPTV) or an audio-only stream (e.g., Internet radio), for example.

At block 402, the real-time media stream is received as the stream is multicast by a remote computing system. The real-time media stream may be multicast by the data center 104 of FIG. 1, for example, after encoding by the live encoder 114 and buffering by the delay unit 116. As portions of the real-time media stream are received at block 402 (e.g., in a continuous or periodic manner), a number of operations may occur, as represented in FIG. 5 by the blocks 404 through 416. The multicast real-time media stream may be received via a satellite link, such as one of the links 132 in FIG. 1, for example. In some implementations, metadata is received along with (e.g., embedded in) the real-time media stream. The metadata may indicate boundaries between segments of the real-time media stream, and/or specify segment identifiers that each correspond to a different one of those segments. In one implementation, the metadata includes data structures that are arranged in accordance with a modified version of the EPB specification, and embedded as markers at the start or end of each segment (e.g., as discussed above in connection with FIG. 1).

At block 404, as the portions of the stream are received, the real-time media stream is packaged into a plurality of time-delineated media segments. The real-time media stream may be a UDP stream, for example, and may be packaged into the segments using DASH, HDS, HTTP Live Streaming (HLS) or another suitable protocol. In some implementations where metadata associated with the real-time media stream is received at block 402, block 404 includes segmenting the real-time media stream according to boundaries indicated by the metadata, and/or naming the plurality of time-delineated media segments based on segment identifiers specified by the metadata.

At block 406, the time-delineated media segments are input into a buffer, such as the buffer 140 of FIG. 1 or the buffer 214 of FIG. 2, for example. The buffer delays the real-time media stream by a buffer time value that is equal to or greater than the duration of N time-delineated media segments. N may be an integer greater than or equal to one, or greater than or equal to three, etc.

At block 408, after a signal loss event, one or more missing time-delineated media segments are identified. The signal loss event may be a satellite or satellite spot beam handoff, for example. Alternatively, in some implementations and/or scenarios, the signal loss event may be a period of poor signal reception (e.g., due to low signal power or high interference, etc.), or any other event that causes a part of the real-time media stream to be incorrectly received. The missing segment(s) may be identified before the segment(s) would normally (i.e., but for the signal loss event) have been produced by the packaging at block 404, and/or after that time, in different implementations. The duration of the N segments associated with the buffer, discussed above in connection with block 406, may be designed to be greater than or equal to the maximum amount of time that is anticipated to be needed for the handoff or other signal loss event.

The missing segment(s) may be identified using various different techniques, depending on the embodiment. If the real-time media stream includes embedded metadata specifying segment identifiers for each segment, for example, successive segment identifiers may be compared at block 408 to determine whether an unexpected gap exists (e.g., for sequentially-numbered identifiers, by determining whether a number value of an (i+1)-th marker in the received real-time media stream is greater than a number value of an i-th marker in the received real-time media stream by more than one).

At block 410, a request for the missing time-delineated media segment(s) is caused to be sent to the remote computing system. The request may be sent via a new satellite link (e.g., a link unicast HTTP interface of a server or other computing device in the remote computing system, for example. Moreover, the request may be sent to the same remote computing system component and/or location from which the real-time media stream is multicast, or to a different component and/or location.

At block 412, in response to the request, the one or more missing time-delineated media segments are received from the remote computing system via a unicast transmission. The missing segment(s) may be received via the same satellite link that was used to send the request, and/or may be received via the same unicast HTTP interface that was used to send the request. Moreover, the missing segment(s) may be received from the same remote computing system component and/or location to which the request was sent, or from a different component and/or location.

At block 414, the missing time-delineated media segment(s) is/are inserted into the buffer, in sequence with the plurality of time-delineated media segments being packaged at block 404. For example, if two contiguous segments in the buffer have been named "0045" and "0049" (e.g., as named by the packager 136 of FIG. 1 based on segment identifiers in metadata embedded in the real-time media stream), and if missing segments named "0046" through "0048" (e.g., as named by the ground packager 120 of FIG. 1, also based on embedded segment identifiers) are received at block 412, the missing segments may be inserted into the buffer in numeric order between the segments "0045" and "0049" such that the segments are read out of the buffer (at block 416, discussed below) in the order: "0045," "0046," "0047," "0048," "0049."

At block 416, the buffered real-time media stream, including the missing time-delineated media segment(s) inserted at block 414, is caused to be provided to the one or more electronic devices on-board the vehicle, e.g., for presentation to one or more respective end users. The real-time media stream may be provided to the electronic device(s) using any suitable technique, such as providing the media stream to one or more on-board wireless access points (e.g., wireless access point(s) 220 of FIG. 2) for transmission to the electronic device(s), for example.

Figure 6:
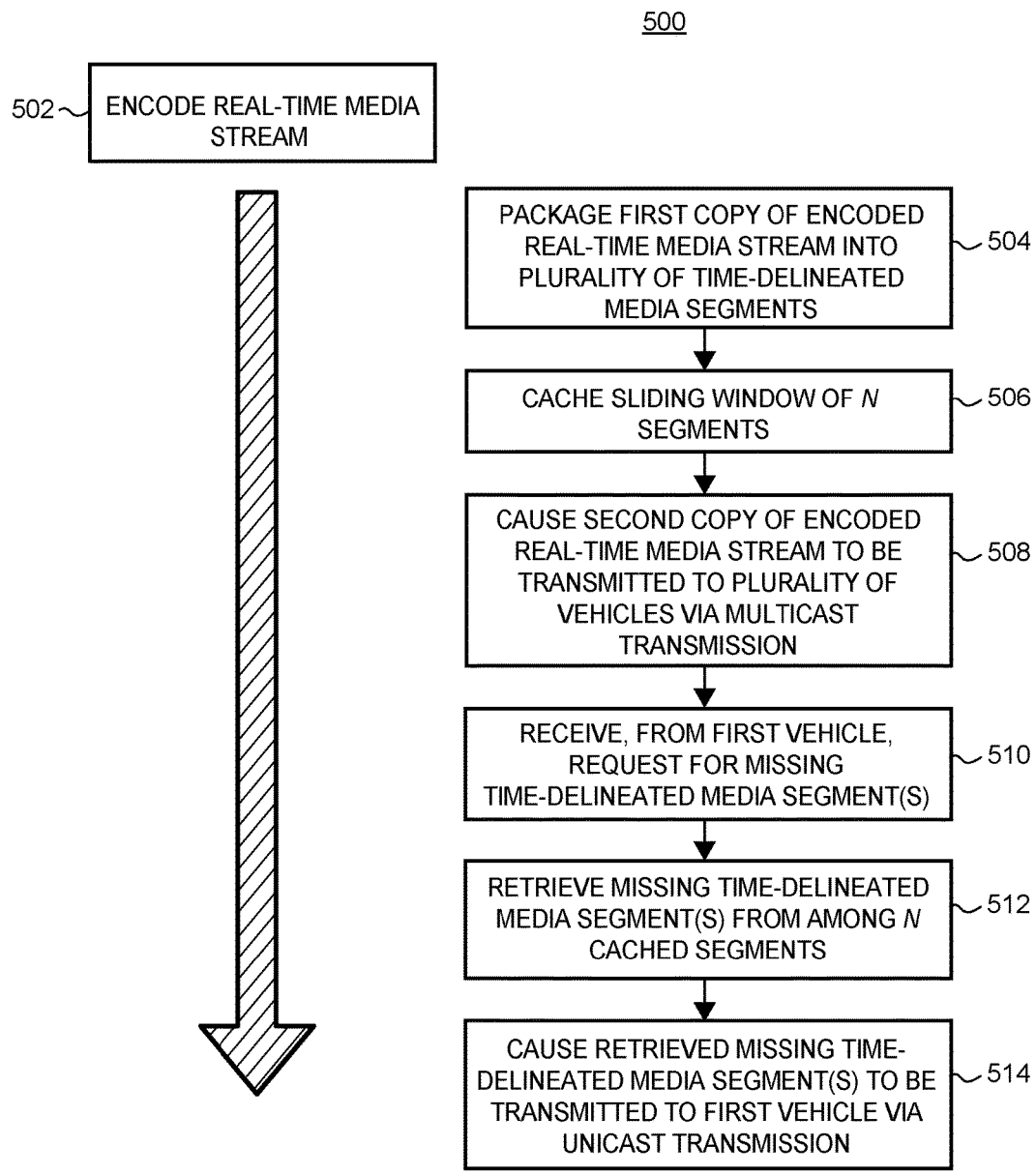
FIG. 6 depicts an exemplary method, implemented by a computing system located remotely from a plurality of vehicles, of seamlessly providing a real-time media stream at least to one or more electronic devices on-board a first vehicle of the plurality of vehicles.

FIG. 6 illustrates an exemplary method 500, implemented by a computing system (e.g., the data center 104 of FIG. 1) located remotely from a plurality of vehicles (e.g., the vehicles 102 of FIG. 1), of seamlessly providing a real-time media stream at least to one or more electronic devices on-board a first vehicle of the plurality of vehicles (e.g., the entertainment devices 108 on-board the vehicle 102x of FIG. 1, or the entertainment devices 204 on-board the vehicle 202 of FIG. 2). It is understood that portions of the method 500 may be repeated (e.g., blocks 510, 512 and 514) to provide a similar seamless experience for electronic devices on-board one or more others of the plurality of vehicles, in addition to the first vehicle. The real-time media stream may be a video stream (e.g., IPTV) or an audio-only stream (e.g., Internet radio), for example. In one embodiment, the method 500 occurs in parallel with the method 400, with the former representing ground operations and the latter representing airplane (or other vehicle) operations.

At block 502, the real-time media stream is encoded (e.g., by the live encoder 114 of FIG. 1). As portions of the real-time media stream are encoded at block 502 (e.g., in a continuous or periodic manner), a number of operations may occur, as represented in FIG. 6 by the blocks 504 through 514. The encoding at block 502 may include generating metadata indicating boundaries between segments of the real-time media stream, and/or specifying information such as segment identifiers for each segment. In one implementation, the metadata includes data structures that are arranged in accordance with a modified version of the EPB specification, and embedded as markers at the start or end of each segment (e.g., as discussed above in connection with FIG. 1). The encoded real-time media stream may be a UDP stream, for example.

At block 504, a first copy of the encoded real-time media stream is packaged, as the portions of the stream are encoded, into a plurality of time-delineated media segments. The first copy of the real-time media stream (e.g., UDP stream) may be packaged into the time-delineated media segments using DASH, HDS, HTTP Live Streaming or another suitable protocol (e.g., a same protocol used for packaging real-time media streams at the first vehicle), for example. The packaging may include segmenting the real-time media stream according to boundaries indicated by the metadata generated at block 502, and/or naming the segments based on segment identifiers specified by the metadata generated at block 502.

At block 506, a sliding window of N segments of the time-delineated media segments are cached (e.g., stored in a buffer, such as a buffer of the cache 122 of FIG. 1), where N is an integer greater than or equal to one (or greater than or equal to some other integer, such as two, three, etc.). The value of N may be set equal to a number of segments buffered at the first vehicle (e.g., as discussed above in connection with block 406 of the method 400).

At block 508, a second copy of the encoded real-time media stream is caused to be transmitted to the plurality of vehicles via a multicast transmission (e.g., via a number of satellite links 132 of FIG. 1). In some implementations, the method 500 further includes buffering the second copy of the encoded real-time media stream by a buffer time value to delay the multicast transmission, thereby ensuring that missing segments are available in the cache when needed. The buffer time value may be equal to or greater than the duration of one (or two, three, etc.) of the time-delineated media segments.

At block 510, a request for one or more missing time-delineated media segments is received from the first vehicle (e.g., via one of satellite links 132 of FIG. 1) after a signal loss event occurs. The signal loss event may be a satellite or satellite spot beam handoff, for example. Alternatively, in some implementations and/or scenarios, the signal loss event may be a period of poor signal reception (e.g., due to low signal power or high interference, etc.), or any other event that causes the first vehicle to incorrectly receive a part of the multicast copy of the real-time media stream. The duration of the N segments associated with the cache/buffer, discussed above in connection with block 506, may be designed to be greater than or equal to the maximum amount of time that is anticipated to be needed for the handoff or other signal loss event. The received request may include one or more segment identifiers each corresponding to a different one of the one or more missing segments, for example, or may include a segment identifier of a first missing segment along with a count of missing, contiguous segments, etc.

At block 512, the one or more missing time-delineated media segments are retrieved from among the N cached segments. To identify which segments are to be retrieved, one or more segment identifiers (and/or a count of missing segments) included in the request may be analyzed. The segment identifiers may match the names of segments in the cache exactly (e.g., an identifier of "0077" in the request indicating that a packaged segment named "0077" should be retrieved from the cache), or a correlation between segment identifiers and names may be known in advance (e.g., an identifier of "0077" in the request indicating that a packaged segment named the hexadecimal equivalent "4D" should be retrieved from the cache), for example.

At block 514, the one or more missing time-delineated media segments retrieved at block 512 are caused to be transmitted to the first vehicle via a unicast transmission (e.g., via a same one of satellite links 132 on which the request was received at block 510, but in the reverse direction). The method 500 may include providing a unicast HTTP interface, via which the request is received at block 512 and the missing segment(s) is/are provided at block 514. The missing segment(s) may be transmitted to the first vehicle at a higher data rate than the multicast transmission.

Figure 7:
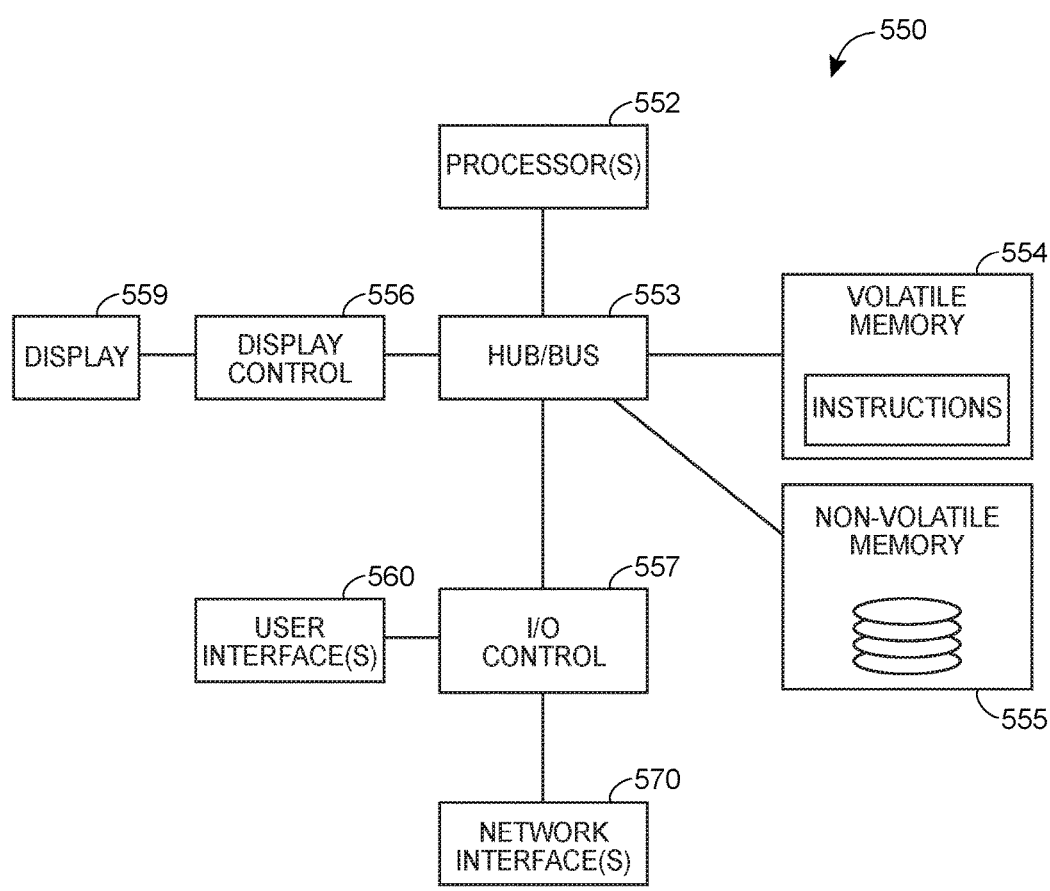
FIG. 7 is a block diagram of an example computing device that may be utilized in a content provision system.

FIG. 7 illustrates a block diagram of an example computing device 550 that may be utilized in the content provision system 100. For example, one or more computing devices 550 may be particularly configured to be utilized as at least a portion of the data center 104, the ground packager 120, the on-board node 106 or 206, or the entertainment devices 108 or 204.

The computing device 550 may include, for example, one more central processing units (CPUs) or processors 552, and one or more busses or hubs 553 that connect the processor(s) 552 to other elements of the computing device 550, such as a volatile memory 554, a non-volatile memory 555, a display controller 556, and an I/O controller 557. The volatile memory 554 and the non-volatile memory 555 may each include one or more non-transitory, tangible computer readable storage media such as random access memory (RAM), read only memory (ROM), FLASH memory, a biological memory, a hard disk drive, a digital versatile disk (DVD) disk drive, etc.

In an embodiment, the memory 554 and/or the memory 555 may store instructions 558 that are executable by the processor 552. For example, in a computing device particularly configured to be included in the data center 104, the instructions 558 may be the instructions for executing the operations of the ground packager 120, as described above. In another example, in a computing device 550 particularly configured to be the on-board node 206, the instructions 558 may be the instructions for executing the operations of the packager 212 and/or the segment retrieval and insertion unit 216, as described above. In yet another example, in a computing device 550 particularly configured to be one of entertainment devices 108, the instructions 558 may be the instructions for executing the VTA. Indeed, each of the modules, applications and engines described herein can correspond to a different set of machine readable instructions for performing one or more functions described above. These modules need not be implemented as separate software programs, procedures or modules, and thus various subsets of these modules can be combined or otherwise re-arranged in various embodiments. In some embodiments, at least one of the memories 554, 555 stores a subset of the modules and data structures identified herein. In other embodiments, at least one of the memories 554, 555 stores additional modules and data structures not described herein.

In an embodiment, the display controller 556 may communicate with the processor(s) 552 to cause information to be presented on a connected display device 559. In an embodiment, the I/O controller 557 may communicate with the processor(s) 552 to transfer information and commands to/from the user interface 560, which may include a mouse, a keyboard or key pad, a touch pad, click wheel, lights, a speaker, a microphone, etc. In an embodiment, at least portions of the display device 559 and of the user interface 560 are combined in a single, integral device, e.g., a touch screen. Additionally, data or information may be transferred to and from the computing device 550 via a network interface 570. In some embodiments, the computing device 550 may include more than one network interface 570, such as a wireless interface and a wired interface.

The illustrated computing device 550 is only one example of a computing device suitable to be particularly configured for use in the content provision system 100. Other embodiments of the computing device 550 may also be used in the content provision system 100, even if the other embodiments have more, fewer and/or different components than those shown in FIG. 7, have one or more combined components, or have a different configuration or arrangement of the components. Moreover, the various components shown in FIG. 7 can be implemented in hardware, a processor executing software instructions, or a combination of both hardware and a processor executing software instructions, including one or more signal processing and/or application specific integrated circuits.

Of course, the applications and benefits of the systems, methods and techniques described herein are not limited to only the above examples. Many other applications and benefits are possible by using the systems, methods and techniques described herein.

Furthermore, when implemented, any of the methods and techniques described herein or portions thereof may be performed by executing software stored in one or more non-transitory, tangible, computer readable storage media or memories such as magnetic disks, laser disks, optical discs, semiconductor memories, biological memories, other memory devices, or other storage media, in a RAM or ROM of a computer or processor, etc.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

1. A method, implemented by an on-board system of a vehicle, of seamlessly providing a real-time media stream to one or more electronic devices on-board the vehicle, the method comprising: (1) receiving a real-time media stream, the real-time media stream being multicast by a remote computing system; and while receiving portions of the real-time media stream: (2) packaging the real-time media stream into a plurality of time-delineated media segments; (3) inputting the plurality of time-delineated media segments into a buffer, wherein the buffer delays the real-time media stream by a buffer time value that is equal to or greater than a duration of N of the time-delineated media segments, and wherein N is an integer greater than or equal to one; (4) identifying, after a signal loss event, one or more missing time-delineated media segments; (5) causing a request for the one or more missing time-delineated media segments to be sent to the remote computing system; (6) receiving the one or more missing time-delineated media segments from the remote computing system via a unicast transmission; (7) inserting the one or more missing time-delineated media segments into the buffer in sequence with the plurality of time-delineated media segments; and (8) causing the buffered real-time media stream, including the inserted one or more missing time-delineated media segments, to be provided to the one or more electronic devices on-board the vehicle.

2. The method of aspect 1, wherein: the vehicle is an aircraft; the method comprises receiving the real-time media stream via a first satellite link; the signal loss event is a handoff between either (i) two satellites, or (ii) two spot beams of a single satellite; and the duration of the N time-delineated media segments is greater than or equal to an anticipated maximum time needed for the handoff.

3. The method of aspect 2, wherein the method comprises, while receiving the portions of the real-time media stream: causing the request for the one or more missing time-delineated media segments to be sent to the remote computing system via a second satellite link; and receiving the one or more missing time-delineated media segments via the second satellite link.

4. The method of any one of aspects 1 through 3, wherein: receiving the real-time media stream includes receiving metadata associated with the real-time media stream, the metadata being indicative of boundaries between segments of the real-time media stream; and packaging the received real-time media stream into the plurality of time-delineated media segments includes segmenting the real-time media stream according to the boundaries indicated by the metadata.

5. The method of aspect 4, wherein: the metadata further specifies segment identifiers each corresponding to a different one of the segments of the real-time media stream; and packaging the received real-time media stream into the plurality of time-delineated media segments further includes naming the plurality of time-delineated media segments based on the segment identifiers specified by the metadata.

6. The method of aspect 5, wherein identifying the one or more missing time-delineated media segments includes comparing successive segment identifiers specified by the metadata.

7. The method of aspect 6, wherein: the successive segment identifiers include a first segment identifier corresponding to an i-th marker in the received real-time media stream and a second segment identifier corresponding to an (i+1)-th marker in the received real-time media stream; and comparing the successive segment identifiers specified by the metadata to identify the one or more missing time-delineated media segments includes subtracting a value of the first segment identifier from a value of the second segment identifier to determine a number of missing time-delineated media segments.

8. The method of any one of aspects 1 through 7, wherein the method comprises: causing the request for the one or more missing time-delineated media segments to be sent to the remote computing system via a unicast HTTP interface; and receiving the one or more missing time-delineated media segments via the unicast HTTP interface.

9. The method of any one of aspects 1 through 8, wherein: the real-time media stream is multicast by a first component of the remote computing system; the method comprises causing the request for the one or more missing time-delineated media segments to be sent to a second component of the remote computing system, the second component being remote from the first component; and the method comprises receiving the one or more missing time-delineated media segments from the second component of the remote computing system via the unicast transmission.

10. The method of any one of aspects 1 through 9, wherein causing the buffered real-time media stream, including the inserted one or more missing time-delineated media segments, to be provided to the one or more electronic devices includes providing the buffered real-time media stream to an on-board wireless access point for transmission to the one or more electronic devices.

11. The method of any one of aspects 1 through 10, wherein N is an integer greater than or equal to three.

12. An on-board system for seamlessly providing real-time media streams to one or more electronic devices on-board a vehicle carrying the on-board system, the on-board system comprising: one or more processors; and one or more non-transitory, tangible computer-readable storage media storing computer-executable instructions that, when executed by the one or more processors, cause the on-board system to: (1) receive a real-time media stream that is multicast by a remote computing system; and while receiving portions of the real-time media stream: (2) package the received real-time media stream into a plurality of time-delineated media segments; (3) input the plurality of time-delineated media segments into a buffer, wherein the buffer delays the real-time media stream by a buffer time value that is equal to or greater than a duration of N of the time-delineated media segments, and wherein N is an integer greater than or equal to one; (4) identify, after a signal loss event, one or more missing time-delineated media segments; (5) cause a request for the one or more missing time-delineated media segments to be sent to the remote computing system; (6) receive the one or more missing time-delineated media segments from the remote computing system via a unicast transmission; (7) insert the one or more missing time-delineated media segments into the buffer in sequence with the plurality of time-delineated media segments; and (8) cause the buffered real-time media stream, including the inserted one or more missing time-delineated media segments, to be provided to the one or more electronic devices on-board the vehicle.

13. The on-board system of aspect 12, wherein: the vehicle is an aircraft; the computer-executable instructions, when executed by the one or more processors, cause the on-board system to (i) receive the real-time media stream via a first satellite link, (ii) cause the request for the one or more missing time-delineated media segments to be sent to the remote computing system via a second satellite link, and (iii) receive the one or more missing time-delineated media segments via the second satellite link; the signal loss event is a handoff between either (i) two satellites, or (ii) two spot beams of a single satellite; and the duration of the N time-delineated media segments is greater than or equal to an anticipated maximum time needed for the handoff.

14. The on-board system of aspect 13, further comprising: one or more on-board wireless access points configured to transmit WiFi signals; one or more satellite transceivers configured to transmit and receive satellite signals, wherein the computer-executable instructions, when executed by the one or more processors, cause the on-board system to (i) receive the real-time media stream via the one or more satellite transceivers, (ii) cause the request for the one or more missing time-delineated media segments to be sent via the one or more satellite transceivers, (iii) receive the one or more missing time-delineated media segments via the one or more satellite transceivers, and (iv) cause the buffered real-time media stream, including the inserted one or more missing time-delineated media segments, to be provided to the one or more electronic devices via the one or more on-board wireless access points.

15. The on-board system of any one of aspects 12 through 14, wherein the computer-executable instructions, when executed by the one or more processors, cause the on-board system to: receive the real-time media stream along with metadata associated with the real-time media stream, the metadata (i) being indicative of boundaries between segments of the real-time media stream and (ii) specifying segment identifiers each corresponding to a different one of the segments of the real-time media stream; package the received real-time media stream into the plurality of time-delineated media segments at least by (i) segmenting the real-time media stream according to the boundaries indicated by the metadata and (ii) naming the plurality of time-delineated media segments based on the segment identifiers specified by the metadata; and identify the one or more missing time-delineated media segments at least by comparing successive segment identifiers specified by the metadata.

16. A method, implemented by a computing system located remotely from a plurality of vehicles, of seamlessly providing a real-time media stream at least to one or more electronic devices on-board a first vehicle of the plurality of vehicles, the method comprising: (1) encoding a real-time media stream, at least in part by generating metadata indicating boundaries between segments of the real-time media stream; and while encoding portions of the real-time media stream: (2) packaging a first copy of the encoded real-time media stream into a plurality of time-delineated media segments, at least in part by segmenting the real-time media stream according to the boundaries indicated by the metadata; (3) caching a sliding window of N segments of the plurality of time-delineated media segments, N being an integer greater than or equal to one; (4) causing a second copy of the encoded real-time media stream to be transmitted to the plurality of vehicles via a multicast transmission; (5) receiving, from the first vehicle and after a signal loss event, a request for one or more missing time-delineated media segments; (6) retrieving the one or more missing time-delineated media segments from among the cached N segments; and (7) causing the retrieved one or more missing time-delineated media segments to be transmitted to the first vehicle via a unicast transmission.

17. The method of aspect 16, further comprising: buffering the second copy of the encoded real-time media stream by a buffer time value to delay the multicast transmission, the buffer time value being equal to or greater than a duration of one of the time-delineated media segments.

18. The method of aspect 16 or 17, wherein: the metadata also specifies segment identifiers each corresponding to a different one of the segments of the real-time media stream; and packaging the first copy of the encoded real-time media stream into the plurality of time-delineated segments includes naming the plurality of time-delineated media segments based on the segment identifiers specified by the metadata.

19. The method of aspect 18, wherein: receiving a request for the one or more missing time-delineated media segments includes receiving a set of one or more segment identifiers each corresponding to a different one of the one or more missing time-delineated media segments; and retrieving the one or more missing time-delineated media segments from among the cached N segments includes retrieving the one or more missing time-delineated media segments using the received set of one or more segment identifiers.

20. The method of any one of aspects 16 through 19, wherein: the vehicle is an aircraft; the signal loss event is a handoff between either (i) two satellites, or (ii) two spot beams of a single satellite; the duration of the N time-delineated media segments is greater than or equal to an anticipated maximum time needed for the handoff; and the method comprises, while encoding the portions of the real-time media stream: causing the second copy of the encoded real-time media stream to be transmitted to the plurality of vehicles via a plurality of satellite links; receiving the request for the one or more missing time-delineated media segments via a first satellite link; and causing the retrieved one or more missing time-delineated media segments to be transmitted to the first vehicle via the first satellite link.

Thus, many modifications and variations may be made in the techniques, methods, and structures described and illustrated herein without departing from the spirit and scope of the present claims. Accordingly, it should be understood that the methods and apparatus described herein are illustrative only and are not limiting upon the scope of the claims.

What is claimed is:

1. A method, implemented by an on-board system of an aircraft, of seamlessly providing a real-time media stream to one or more electronic devices on-board the aircraft, the method comprising:
   receiving a real-time media stream via a first satellite link, the real-time media stream being multicast by a remote computing system; and
   while receiving portions of the real-time media stream:
      packaging the real-time media stream into a plurality of time-delineated media segments;
      inputting the plurality of time-delineated media segments into a buffer, wherein the buffer delays the real-time media stream by a buffer time value that is equal to or greater than a duration of N of the time-delineated media segments, and wherein N is an integer greater than or equal to one;
      identifying, after a signal loss event, one or more missing time-delineated media segments, wherein the signal loss event is a handoff between either (i) two satellites, or (ii) two spot beams of a single satellite, and wherein the duration of the N time-delineated media segments is greater than or equal to an anticipated maximum time needed for the handoff;
      causing a request for the one or more missing time-delineated media segments to be sent to the remote computing system;
      receiving the one or more missing time-delineated media segments from the remote computing system via a unicast transmission;
      inserting the one or more missing time-delineated media segments into the buffer in sequence with the plurality of time-delineated media segments; and
      causing the buffered real-time media stream, including the inserted one or more missing time-delineated media segments, to be provided to the one or more electronic devices on-board the aircraft.

2. The method of claim 1, wherein the method comprises, while receiving the portions of the real-time media stream:
   causing the request for the one or more missing time-delineated media segments to be sent to the remote computing system via a second satellite link; and
   receiving the one or more missing time-delineated media segments via the second satellite link.

3. The method of claim 1, wherein:
   receiving the real-time media stream includes receiving metadata associated with the real-time media stream, the metadata being indicative of boundaries between segments of the real-time media stream; and packaging the received real-time media stream into the plurality of time-delineated media segments includes segmenting the real-time media stream according to the boundaries indicated by the metadata.

4. The method of claim 3, wherein:
the metadata further specifies segment identifiers each corresponding to a different one of the segments of the real-time media stream; and
packaging the received real-time media stream into the plurality of time-delineated media segments further includes naming the plurality of time-delineated media segments based on the segment identifiers specified by the metadata.

5. The method of claim 4, wherein identifying the one or more missing time-delineated media segments includes comparing successive segment identifiers specified by the metadata.

6. The method of claim 5, wherein:
the successive segment identifiers include a first segment identifier corresponding to an i-th marker in the received real-time media stream and a second segment identifier corresponding to an (i+1)-th marker in the received real-time media stream; and
comparing the successive segment identifiers specified by the metadata to identify the one or more missing time-delineated media segments includes subtracting a value of the first segment identifier from a value of the second segment identifier to determine a number of missing time-delineated media segments.

7. The method of claim 1, wherein the method comprises:
causing the request for the one or more missing time-delineated media segments to be sent to the remote computing system via a unicast HTTP interface; and
receiving the one or more missing time-delineated media segments via the unicast HTTP interface.

8. The method of claim 1, wherein:
the real-time media stream is multicast by a first component of the remote computing system;
the method comprises causing the request for the one or more missing time-delineated media segments to be sent to a second component of the remote computing system, the second component being remote from the first component; and
the method comprises receiving the one or more missing time-delineated media segments from the second component of the remote computing system via the unicast transmission.

9. The method of claim 1, wherein causing the buffered real-time media stream, including the inserted one or more missing time-delineated media segments, to be provided to the one or more electronic devices includes providing the buffered real-time media stream to an on-board wireless access point for transmission to the one or more electronic devices.

10. The method of claim 1, wherein N is an integer greater than or equal to three.

11. An on-board system for seamlessly providing real-time media streams to one or more electronic devices on-board an aircraft carrying the on-board system, the on-board system comprising:
one or more processors; and
one or more non-transitory, tangible computer-readable storage media storing computer-executable instructions that, when executed by the one or more processors, cause the on-board system to:
receive, via a first satellite link, a real-time media stream that is multicast by a remote computing system; and
while receiving portions of the real-time media stream:
package the received real-time media stream into a plurality of time-delineated media segments;
input the plurality of time-delineated media segments into a buffer, wherein the buffer delays the real-time media stream by a buffer time value that is equal to or greater than a duration of N of the time-delineated media segments, and wherein N is an integer greater than or equal to one;
identify, after a signal loss event, one or more missing time-delineated media segments, wherein the signal loss event is a handoff between either (i) two satellites, or (ii) two spot beams of a single satellite, and wherein the duration of the N time-delineated media segments is greater than or equal to an anticipated maximum time needed for the handoff;
cause a request for the one or more missing time-delineated media segments to be sent to the remote computing system;
receive the one or more missing time-delineated media segments from the remote computing system via a unicast transmission;
insert the one or more missing time-delineated media segments into the buffer in sequence with the plurality of time-delineated media segments; and
cause the buffered real-time media stream, including the inserted one or more missing time-delineated media segments, to be provided to the one or more electronic devices on-board the aircraft.

12. The on-board system of claim 11, wherein:
the computer-executable instructions, when executed by the one or more processors, cause the on-board system to (i) cause the request for the one or more missing time-delineated media segments to be sent to the remote computing system via a second satellite link, and (ii) receive the one or more missing time-delineated media segments via the second satellite link.

13. The on-board system of claim 12, further comprising:
one or more on-board wireless access points configured to transmit WiFi signals;
one or more satellite transceivers configured to transmit and receive satellite signals,
wherein the computer-executable instructions, when executed by the one or more processors, cause the on-board system to (i) receive the real-time media stream via the one or more satellite transceivers, (ii) cause the request for the one or more missing time-delineated media segments to be sent via the one or more satellite transceivers, (iii) receive the one or more missing time-delineated media segments via the one or more satellite transceivers, and (iv) cause the buffered real-time media stream, including the inserted one or more missing time-delineated media segments, to be provided to the one or more electronic devices via the one or more on-board wireless access points.

14. The on-board system of claim 11, wherein the computer-executable instructions, when executed by the one or more processors, cause the on-board system to:
receive the real-time media stream along with metadata associated with the real-time media stream, the metadata (i) being indicative of boundaries between segments of the real-time media stream and (ii) specifying segment identifiers each corresponding to a different one of the segments of the real-time media stream;

package the received real-time media stream into the plurality of time-delineated media segments at least by (i) segmenting the real-time media stream according to the boundaries indicated by the metadata and (ii) naming the plurality of time-delineated media segments based on the segment identifiers specified by the metadata; and identify the one or more missing time-delineated media segments at least by comparing successive segment identifiers specified by the metadata.

15. A method, implemented by a computing system located remotely from a plurality of aircraft, of seamlessly providing a real-time media stream at least to one or more electronic devices on-board a first aircraft of the plurality of aircraft, the method comprising:

encoding a real-time media stream, at least in part by generating metadata indicating boundaries between segments of the real-time media stream; and while encoding portions of the real-time media stream:

packaging a first copy of the encoded real-time media stream into a plurality of time-delineated media segments, at least in part by segmenting the real-time media stream according to the boundaries indicated by the metadata;

caching a sliding window of N segments of the plurality of time-delineated media segments, N being an integer greater than or equal to one;

causing a second copy of the encoded real-time media stream to be transmitted to the plurality of aircraft via a multicast transmission over a plurality of satellite links;

receiving, from the first aircraft and after a signal loss event, a request for one or more missing time-delineated media segments, wherein the signal loss event is a handoff between either (i) two satellites, or (ii) two spot beams of a single satellite, and wherein a duration of the N time-delineated media segments is greater than or equal to an anticipated maximum time needed for the handoff;

retrieving the one or more missing time-delineated media segments from among the cached N segments; and causing the retrieved one or more missing time-delineated media segments to be transmitted to the first aircraft via a unicast transmission.

16. The method of claim 15, further comprising:
buffering the second copy of the encoded real-time media stream by a buffer time value to delay the multicast transmission, the buffer time value being equal to or greater than a duration of one of the time-delineated media segments.

17. The method of claim 15, wherein:
the metadata also specifies segment identifiers each corresponding to a different one of the segments of the real-time media stream; and packaging the first copy of the encoded real-time media stream into the plurality of time-delineated segments includes naming the plurality of time-delineated media segments based on the segment identifiers specified by the metadata.

18. The method of claim 17, wherein:
receiving a request for the one or more missing time-delineated media segments includes receiving a set of one or more segment identifiers each corresponding to a different one of the one or more missing time-delineated media segments; and retrieving the one or more missing time-delineated media segments from among the cached N segments includes retrieving the one or more missing time-delineated media segments using the received set of one or more segment identifiers.

19. The method of claim 15, wherein:
the method comprises, while encoding the portions of the real-time media stream:

receiving the request for the one or more missing time-delineated media segments via a first satellite link; and causing the retrieved one or more missing time-delineated media segments to be transmitted to the first aircraft via the first satellite link.

* * * * *